March 31, 1931.  T. E. MURRAY  1,798,749
SEAL
Filed July 22, 1925
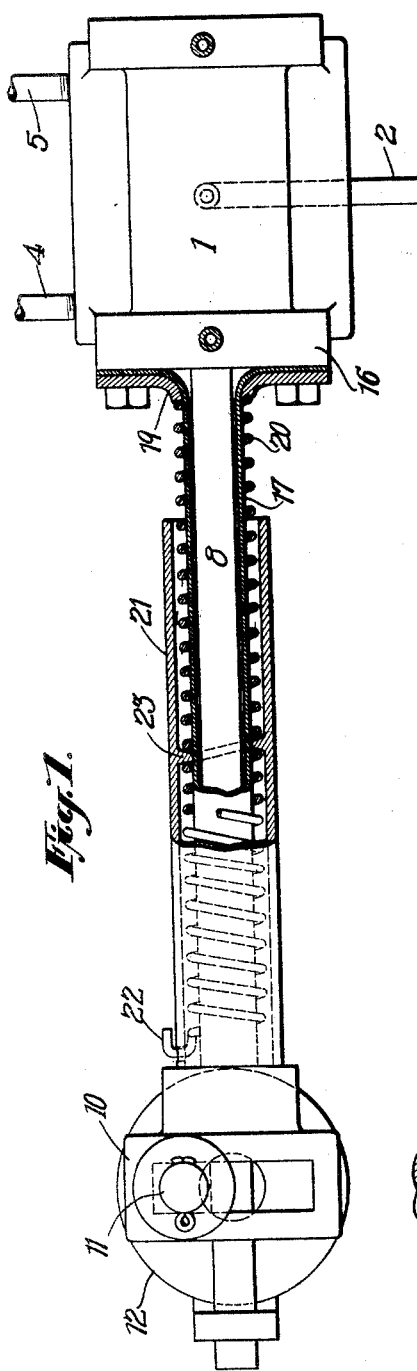
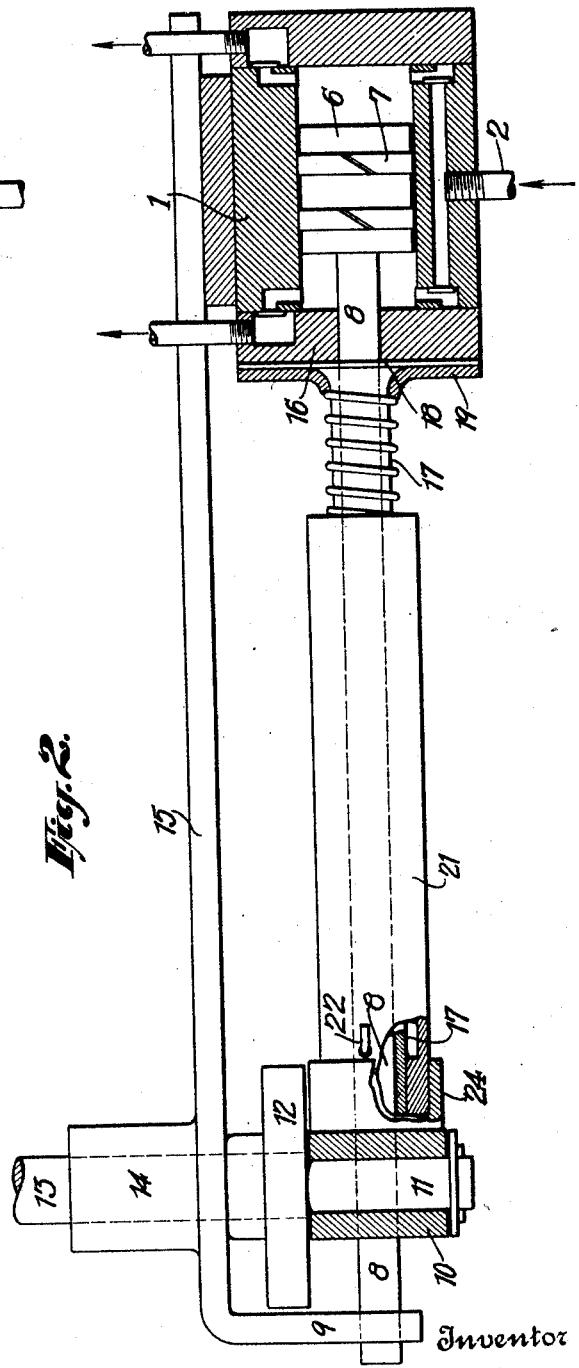
Inventor
THOMAS E. MURRAY.
By His Attorney Patented Mar. 31, 1931

1,798,749

UNITED STATES PATENT OFFICE

THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS TO METROPOLITAN DEVICE CORPORATION, A CORPORATION OF NEW YORK

SEAL

Application filed July 22, 1925. Serial No. 45,442.

My invention aims to provide an improved seal to be used with or in place of stuffing boxes. The accompanying drawings illustrate an embodiment of the invention.

Fig. 1 is a side elevation partly in section; and

Fig. 2 is a plan partly in section.

The invention is shown applied to a refrigerating machine to prevent the escape of gases from the cylinder thereof, and it may be similarly applied to the sealing of various other apparatus against the escape of fluids.

The cylinder 1 communicates through suitable valves with pipe 2 from the cooling coils and with pipes 4 and 5 leading to the expansion valve. Within the cylinder is a piston 6 with packing rings 7 and connected to a piston rod 8 which at its rear end passes through a guide 9. Near its rear end the piston rod includes a yoke 10 in the slot of which is an eccentric pin 11 on a disc 12 which is mounted on the end of a driven shaft 13 passing through a hub 14 on a frame 15 which is fastened to the cylinder or other fixed part of the apparatus. As the shaft 13 is rotated, the piston rod is reciprocated through a head 16 of the cylinder. Various expedients have been adopted for making a tight bearing around the shaft where it passes through the cylinder head, and such devices may be used in connection with the present invention.

Or, as shown, the piston rod may move freely through the opening in the cylinder head and the escape of fluids that come from the cylinder be prevented by the sealing arrangement which I have invented.

Immediately around the piston rod is a tube 17 of pure gum rubber so as to be capable of extension and contraction for a long time without loss of its properties and which is impervious to the gases. At the cylinder end this tube is flared to form a flange 18 bearing against the face of the cylinder head and fastened and compressed firmly against the same by means of a ring 19 bolted to the cylinder head. At its opposite end the tube 17 is fitted closely and fastened under compression to the shaft 8. Immediately surrounding the rubber tube 17 is a flexible wire spring 20, the right-hand end of which bears against the inner edge of the ring 19. And around the outside of this is a sleeve 21 with play enough between its right-hand end and the head of the cylinder to permit it to reciprocate with the piston rod. The left-hand end of the spring is anchored by a bent end 22 passing through the sleeve 21 near its rear end. And additional anchors or connections to the spring may be provided at intermediate points as by rings 23 on the inside of the sleeve. The sleeve 21 has its rear end thickened to constitute a ring 24 which fits closely over and compresses the end of the rubber tube on to the shaft 8 at this point.

Now when the rod is driven to the right it will compress or take up the previous extension of the length of the rubber tube, and when it moves to the left it will have the opposite effect. The flexible coil 20 holds the rubber tube against substantial distortion. It fits loosely about the rubber tube so as to permit the necessary easy movement of the parts with relation to each other. The stroke is comparatively short so that there is very little alteration of the normal length of the tube and the coil. Thus the tube seals the apparatus completely against the escape of the gas or other fluid in the cylinder and is held in shape so as to be strained only in tension and compression without any bending strains and, therefore, be most durable.

The outer tube 21 furnishes an anchor for the end of the wire coil so as to connect the latter firmly to the rod and to cause the extension and contraction of the coil as the rod reciprocates.

Various modifications may be made in the apparatus illustrated and described without departing from the invention as defined in the following claims.

What I claim is:—

1. The combination with a cylinder, a piston therein and a reciprocating piston rod for actuating said piston extending through the head of the cylinder, of a rubber tube one end of which is fastened to the outside of the cylinder head and the other end of which is fastened to the rod at a point outside of the cylinder, said tube closely surrounding said rod, a spiral coil surrounding said tube so as to hold the tube in shape between the coil and the rod during the reciprocation of the latter, and a sleeve surrounding the spiral coil attached to the rod and engaging the coil between two convolutions at an intermediate point in the length of the coil.

2. The combination with a cylinder, a piston therein and a reciprocating piston rod for actuating said piston extending through the head of the cylinder, of a rubber tube one end of which is fastened to the outside of the cylinder head and the other end of which is fastened to the rod at a point outside of the cylinder, said tube closely surrounding said rod, a spiral coil surrounding said tube so as to hold the tube in shape between the coil and the rod during the reciprocation of the latter, and a sleeve surrounding the coil, said sleeve at one end fitting closely over the rubber tube and compressing it onto the shaft.

In witness whereof, I have hereunto signed my name.

THOMAS E. MURRAY.